(12) United States Patent
Kannari

(10) Patent No.: US 6,746,643 B1
(45) Date of Patent: Jun. 8, 2004

(54) MOLDING METHOD FOR BLOW MOLDED PRODUCT

(75) Inventor: Tadahiro Kannari, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 519 days.

(21) Appl. No.: 09/831,363

(22) PCT Filed: Sep. 13, 2000

(86) PCT No.: PCT/JP00/06272

§ 371 (c)(1),
(2), (4) Date: May 15, 2001

(87) PCT Pub. No.: WO01/21380

PCT Pub. Date: Mar. 29, 2001

(30) Foreign Application Priority Data

Sep. 21, 1999 (JP) ............................................. 11-266509

(51) Int. Cl.[7] ............................................... B29C 49/64
(52) U.S. Cl. ........................................ 264/523; 264/904
(58) Field of Search ................................. 264/523, 904

(56) References Cited

U.S. PATENT DOCUMENTS

| | | | |
|---|---|---|---|
| 4,517,151 A | * 5/1985 | Masumoto et al. | 264/540 |
| 6,303,071 B1 | * 10/2001 | Sugawara et al. | 264/526 |
| 6,423,263 B1 | * 7/2002 | Koizumi et al. | 264/446 |

FOREIGN PATENT DOCUMENTS

| | | |
|---|---|---|
| EP | 0 736 366 | 10/1996 |
| EP | 0 908 292 | 4/1999 |
| JP | 57-212031 | 12/1982 |
| JP | 9-70880 | 3/1997 |
| JP | 10-16042 | 1/1998 |

OTHER PUBLICATIONS

Patent Abstracts of Japan, JP 06-210636, Aug. 2, 1994.
Patent Abstracts of Japan, JP 03-275329, Dec. 6, 1991.

* cited by examiner

*Primary Examiner*—Suzanne E. McDowell
(74) *Attorney, Agent, or Firm*—Oblon, Spivak, McClelland, Maier & Neustadt, P.C.

(57) ABSTRACT

The invention relates to a method for producing blow moldings, especially to a blow-molding method capable of efficiently producing blow moldings of crystalline thermoplastic resin having good surface gloss and good mold transferability of, for example, embossed patterns and, not warped, having a good appearance with no sinkmarks. The method comprises blowing and shaping a parison of a crystalline thermoplastic resin at a mold temperature falling between (the crystallization point of the resin −10° C.) and (the melting point of the resin), then keeping the thus-blown parison at a temperature falling between (the crystallization point of the resin −15° C.) and (the crystallization point thereof −45° C.) for a dwell time of from 30 to 300 seconds, and thereafter cooling it in an ordinary manner.

3 Claims, 2 Drawing Sheets

MOLDING METHOD FOR BLOW MOLDED PRODUCT

TECHNICAL FIELD

The present invention relates to a method for producing blow moldings, especially to a blow-molding method capable of efficiently producing blow moldings of crystalline thermoplastic resin having good surface gloss and good mold transferability of, for example, embossed patterns and, not warped, having a good appearance with no sinkmarks.

BACKGROUND ART

In producing blow moldings of thermoplastic resin, even when a mold having a mirror surface is used, the surface of the blow moldings often have melt fractures and die lines and have pockmarks owing to the gas engulfed and to the crystallization of the resin. In the blow-molding method, therefore, it is impossible to faithfully transfer the surface of the mold used onto the blow moldings produced, and it is difficult to produce blow moldings having a good surface gloss and a good appearance. In particular, the problem is serious in producing blow moldings of crystalline thermoplastic resin.

For producing blow moldings having a good surface gloss, (1) a method has been proposed, which comprises setting a resin parison having, on its surface, a number of small recesses of from 2 to 100 $\mu$m in depth, in the cavity of a mold having a mirror surface of at most 0.5S in roughness and having been heated up to a temperature not lower than the crystallization point of the resin, then blow-molding the parison, and thereafter cooling the mold to a temperature not higher than the crystallization point of the resin (Japanese Patent Publication No. 40498/1990). However, the method is problematic in that the parison must be specifically controlled, that the crystalline resin to be molded is limited to one capable of being processed to have melt fractures, and that the melt fractures are unfavorable for improving the appearance of the moldings produced.

(2) Another blow-molding method proposed comprises setting a crystalline resin-containing flexible resin parison in the cavity of a mold, clamping the molds, applying a pressure fluid into the parison to thereby make the parison airtightly pressed against the surface of the clamped mold, and cooling the thus-molded parison, in which the temperature of the mold is kept between a temperature around which the crystallization rate of the crystalline resin is the largest and the melting point of the resin, a coolant fluid is introduced into the parison under pressure, and the fluid is circulated still under pressure (Japanese Patent Laid-Open No. 77231/1992).

In this method, die lines and weld lines that may appear in the surface of the moldings produced could be reduced. However, the method is still problematic in that the surface of the moldings taken out of the mold is often roughened and stained. In addition, in the method in which a coolant medium is circulated, the coolant efficiency is not all the time good. Therefore, shortening the molding cycle of the method is naturally limited, and the method is not suitable to producing large-size blow moldings.

(3) In still another method proposed, used is a resin having a low melt viscosity. However, the method is problematic in that the resin drawdown is great and the method is not applicable to producing large-size moldings. (4) In still another method proposed, used is a resin of good transferability for an outer layer of moldings. However, the method could not be a substantial solution of the problem, since the resin to be molded therein is limited and since the method requires a complicated apparatus equipped with a multi-layer die.

(5) In still another method proposed, a thermoplastic resin is molded in a mold while the surface of the mold is heated up to a temperature not lower than the Vicat softening point of the resin, and then it is cooled to a temperature not higher than (the Vicat softening point −10° C.) (Japanese Patent Laid-Open No. 276432/1996). The method is favorable to amorphous thermoplastic resins such as ABS resins, but is not to crystalline resins such as polypropylene resins.

(6) In still another method proposed for blow-molding polypropylene, the mold is at least temporarily heated up to a temperature not lower than 140° C., after the start of clamping the mold and before taking the blow molding out of the mold (Japanese Patent Laid-Open No. 138324/1998). The method is suitable for producing blow moldings having a surface gloss of at least 75%, and the blow moldings produced are for exterior parts of automobiles. However, the method generally requires a step of blow-molding the resin at a mold temperature not higher than 80° C. followed by a step of heating the resulting blow molding up to a temperature not lower than 140° C., as is obvious from its examples demonstrated in the laid-open publication. In this method, therefore, the temperature range for heating and cooling the mold in one molding cycle will be broad.

The technique of blow-molding is suitable for producing lightweight, large-size moldings, since the molding pressure is low, the mold and its material are inexpensive and the mold-clamping pressure is low. However, since the molding pressure is low, the mold transferability onto the moldings is not satisfactory. For improving it, it has been proposed to elevate the temperature of the mold surface while the parison in the mold is blow-molded. For example, for crystalline thermoplastic resins, the mold surface is heated up to a temperature around the crystallization point of the resin; and for amorphous thermoplastic resins, it is heated up to a temperature around the Tg of the resin. However, such an increased mold surface temperature is problematic in that the moldings formed are difficult to cool and therefore the molding cycle is inevitably prolonged and the productivity is thereby lowered.

For cooling the moldings, the elevated mold temperature is lowered in every molding cycle. Apart from this, various other methods have been proposed. One method proposed comprises blow-molding a thermoplastic resin parison in a mold followed by introducing a coolant medium into the resulting molding to thereby directly cool it. Anyhow, for cooling the blown parison in the blow-molding method, the mold is cooled, or a coolant medium is introduced into the blown parison to directly cool it, or the two are combined. In the blow-molding method, therefore, the matter of great importance is how to efficiently cool the blown parison. Various proposals have heretofore been made for increasing the cooling rate of blown parisons.

With the development of the technique of blow-molding, extremely complicated blow moldings and large-size blow moldings have come available. In particular, blow moldings of crystalline thermoplastic resin such as polypropylene resin are being much used these days for automobile parts such as bumpers and air spoilers, for housings for musical instruments, and for containers, as they are lightweight and recyclable and can be entirely made of one and the same type of resin. It is important that the moldings for them should have a good appearance, and mirror surface transfer of the mold used to the moldings produced must be ensured. For such mirror surface transfer, the mold temperature at which a resin parison is blow-molded into a molding must be near the crystallization point of the resin. Accordingly, after a resin parison has been blow-molded in a high-temperature mold, the resulting blow molding is cooled to have a good surface gloss.

In a process of blow-molding crystalline thermoplastic resin, the blow moldings produced must be cooled at a constant cooling rate. If not, or that is, if the blow moldings are not cooled uniformly, they will have sinkmarks and will be warped, and, in addition, their dimensional accuracy will lower. As a result, they have no market value, and will be impracticable. For uniformly cooling the blow moldings, the cooling rate may be lowered. In ordinary blow-molding, however, the mold temperature is generally kept near the crystallization point of the resin being blow-molded. Therefore, if the cooling rate is lowered in the method, it will be often impossible to substantially cool the blow moldings at such a low cooling rate. Even if they could be cooled at such a low cooling rate, the cooling time will be prolonged, and this will be against the improvement of productivity that shall be attained by reducing the molding cycle.

The object of the present invention is to provide a method for efficiently producing blow moldings of crystalline thermoplastic resin, in which the blow moldings produced have good mold transferability and good surface gloss and, not warped, have good dimensional stability with no sinkmarks.

DISCLOSURE OF THE INVENTION

We, the present inventors have assiduously studied blow moldings of crystalline thermoplastic resin, discussing the problem of how to improve their surface gloss and their mold transferability of, for example, embossed patterns and how to prevent the blow moldings from having sinkmarks and from being warped. As a result, we have found that, when the cooling condition in the method of producing the blow moldings is controlled, then the blow moldings produced have a good surface gloss and, not warped, have a totally excellent appearance with no sinkmarks. On the basis of this finding, we have completed the present invention.

Specifically, the invention provides the following:

(1) A method for producing blow moldings of crystalline thermoplastic resin, which comprises setting a melt parison of a crystalline thermoplastic resin in a mold and then blowing the parison, and is characterized in that the parison is blown and shaped at a mold temperature falling between (the crystallization point of the resin −10° C.) and (the melting point of the resin), and then cooled, and that the blown parison is, after kept at a temperature falling between (the crystallization point of the resin −15° C.) and (the crystallization point thereof −45° C.) for a predetermined dwell time, cooled in an ordinary manner.

(2) The blow-molding method of above (1), wherein the dwell time falls between 30 and 300 seconds.

(3) The blow-molding method of above (1), wherein the mold temperature falls between (the crystallization point of the resin −10° C.) and (the crystallization point thereof +10° C.), ad the dwell time falls between 40 and 250 seconds.

(4) The blow-molding method of any of above (1) to (3), wherein the mold cooling rate falls between 50 and 500° C./min.

BRIEF DESCRIPTION OF THE DRAWINGS

In FIG. 1, the numeral reference 1 indicates an extrusion die; 2 indicates a mold; 3 indicates a mold temperature-controlling duct; 4 indicates a coolant fluid jacket; 5 indicates a coolant medium inlet; 6 indicates a coolant medium outlet; 7 indicates a parison pinchcock; 8 indicates a blowing gas duct; 9 indicates a blowing gas duct; and 10 indicates a parison.

BEST MODES OF CARRYING OUT THE INVENTION

Figure 1:
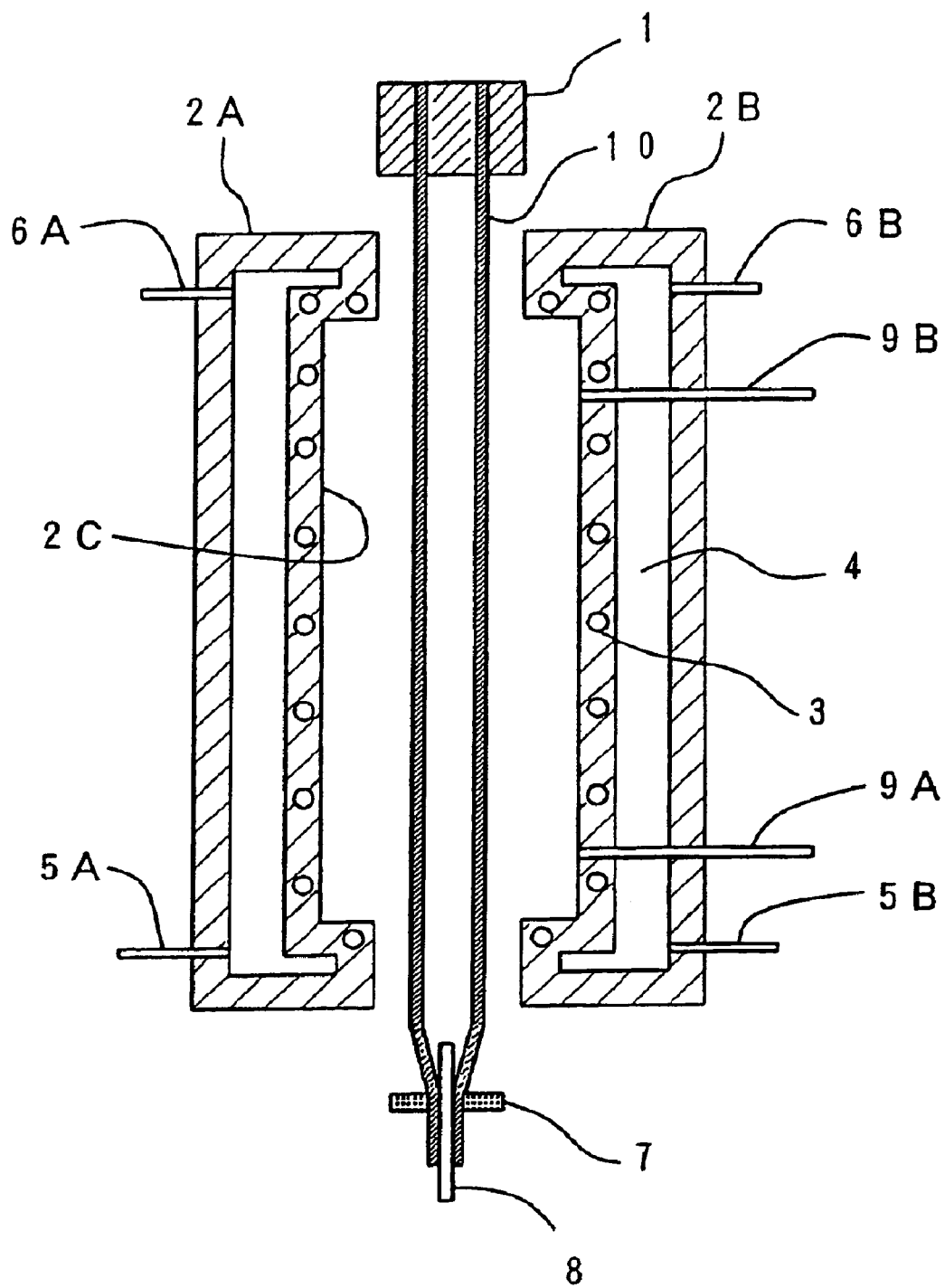
FIG. 1 is a cross-sectional view showing the outline of a molding device for one embodiment of the blow-molding method of the invention, in which the mold is not as yet clamped.

The invention is described in detail hereinunder.

The blow-molding method of the invention is for producing blow moldings having good surface gloss and good mold transferability. Not requiring any secondary processing such as polishing and coating, and optionally containing a colorant, the blow moldings produced can be directly used for automobile parts and others.

Various blow-molding methods have been proposed for producing blow moldings having improved mold transferability and good surface gloss. The methods proposed basically comprise setting a melt parison of a crystalline thermoplastic resin in a mold having been heated at a temperature around the crystallization point of the resin and then blowing the parison to thereby press the parison against the mold surface.

In such methods, blow moldings having a good surface gloss can be produced. In the blow-molding methods, however, the molding pressure, or that is, the blowing pressure is extremely low and the pressure under which the blown parison is pressed against the mold surface and cooled is therefore low, being different from those in an injection-molding method. In addition, the blow moldings produced have a hollow structure and their wall thickness is relatively small. Therefore, when they are cooled in an ordinary cooling condition, they often have sinkmarks. Sinkmarks, if formed, are striking especially when the moldings have a high degree of surface gloss. Moldings with sinkmarks are unacceptable in practical use.

In the blow-molding method of the invention, a melt parison of a crystalline thermoplastic resin is blown and shaped in a mold of which the temperature is near the crystallization point of the resin, and, after the thus-blown parison is kept at a predetermined temperature for a predetermined dwell time, it is cooled in an ordinary manner. Specifically, in the method, the parison is, after having been blown to receive the mold surface profile in an ordinary manner, kept at a temperature specifically predetermined in relation to the crystallization point of the resin to be lower than the crystallization point by a specific temperature range, before it is cooled in an ordinary manner.

The dwell temperature at which the blown resin parison is kept before cooled falls between (the crystallization point of the resin −15° C.) and (the crystallization point thereof −45° C.), preferably between (the crystallization point of the resin −20° C.) and (the crystallization point thereof −400° C.). If the dwell temperature is higher than the uppermost limit, the resin will crystallize too slowly and the productivity of the moldings will lower; but if lower than the lowermost limit, the resin could not uniformly crystallize in every part of its molding and the molding may have sinkmarks.

The dwell time generally falls between 30 and 300 seconds, but preferably between 40 and 200 seconds. The dwell time, if longer, will be more effective; but if longer than 300 seconds, it is unfavorable since the molding cycle is prolonged and the productivity of the moldings lowers. The range of the dwell temperature and that of the dwell time shall be determined, comprehensively depending on the size of the blow moldings to be produced, the thickness thereof, the type of the resin used, and the presence or absence of additives to the molding material, and based on the acceptable degree of sinkmarks of the blow moldings.

Specifically, in the blow-molding method of the invention, not only the degree of resin crystallization in the surface of the blow moldings but also the degree of resin crystallization in every part of the blow moldings is controlled to thereby make it possible to produce good blow moldings having a good surface gloss, and, not warped, having an entirely good appearance with no sinkmarks, and having improved dimensional accuracy.

The invention is described concretely with reference to the drawings attached hereto.

Figure 2:
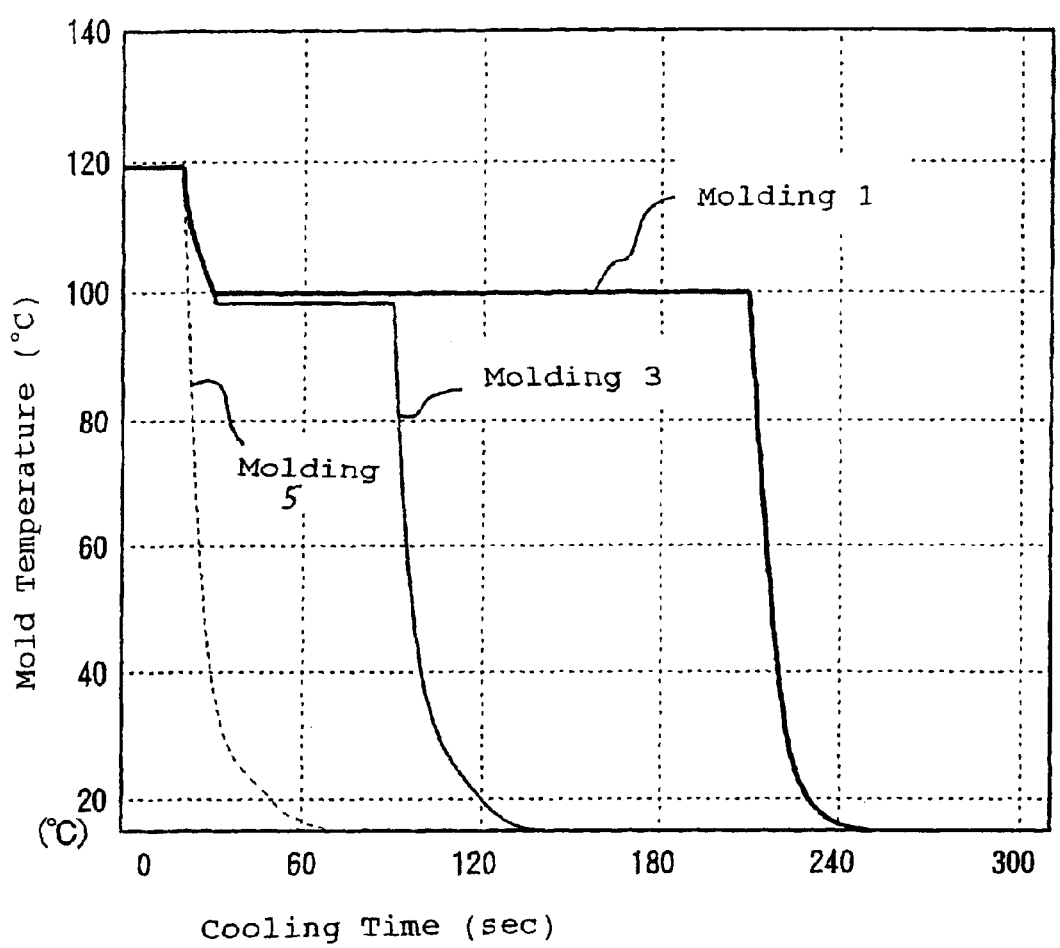
FIG. 2 is a graph showing the cooling temperature pattern of a mold in which a blown parison is cooled.

FIG. 1 is a cross-sectional view showing the outline of a molding device for one embodiment of the blow-molding method of the invention, in which the mold is not as yet clamped. FIG. 2 is a graph showing the cooling temperature pattern of a mold in which a blown parison is cooled.

In FIG. 1, 1 indicates an extrusion die; 2 indicates a mold; 3 indicates a mold temperature-controlling duct; 4 indicates a coolant fluid jacket; 5 indicates a coolant medium inlet; 6 indicates a coolant medium outlet; 7 indicates a parison pinchcock; 8 indicates a blowing gas duct; 9 indicates a blowing gas duct formed through the wall of the mold; and 10 indicates a parison. The device of FIG. 1 is for producing box-type blow moldings. Of the opened mold 2A, 2B, the surface 2° C. is heated at a temperature around the crystallization point of the crystalline thermoplastic resin of the parison 10, for which a hot oil is circulated through the mold temperature-controlling duct 3.

First, a crystalline thermoplastic resin is melted, kneaded and extruded out of an extruder. Generally through an accumulator, the resin melt is introduced into a pair of opened split molds 2A, 2B via an extrusion die 1 to be a cylindrical parison 10. The bottom end of the parison is sealed with a parison pinchcock. Next, the parison 10 is pre-blown with air introduced thereinto through the blowing gas duct 8, whereby the parison 10 is expanded in some degree. Next, the mold 2A, 2B is clamped to hold the parison in its cavity. After the mold 2 has been thus clamped in a desired position, a gas is introduced into the parison so that the parison is hermetically pressed against the mold surface and is shaped.

In the device of FIG. 10, the blowing gas duct 9A and the blowing gas duct 9B are pushed out through the mold surface to thereby pierce the parison wall just before the mold is clamped, and air is introduced into the parison through the ducts to thereby expand the parison. With that, the parison is hermetically pressed against the mold surface to receive the mold surface profile, and is thus shaped. In this process, the mold surface is heated at a temperature around the crystallization point of the resin, and therefore, the blown parison is not rapidly crystallized at its surface contacted with the mold surface, and the profile of the mirror-finished surface 2° C. of the mold is well transferred onto the surface of the blown parison. Having received the mirror surface profile, the blown parison is cooled to be blow molding having a high surface gloss. The blowing gas is not specifically defined, and air is generally used.

In the step of hermetically pressing the parison against the mold surface, the mold must be so heated that its temperature (the mold surface temperature) falls between (the crystallization point of the crystalline resin −10° C.) and (the melting point of the resin). This is indispensable for obtaining blow moldings having good surface characteristics, for example, having good surface gloss. The mold surface temperature is not specifically defined, so far as it falls within the defined range as above. For shortening the molding cycle, however, the temperature preferably falls between (the crystallization point of the resin −10° C.) and (the crystallization point thereof +20° C.), more preferably between (the crystallization point −10° C.) and (the crystallization point +10° C.). The mold temperature will reach a state of equilibrium when the melt parison is hermetically contacted with the mold surface. Therefore, even when the initial mold temperature is lower than the crystallization point of the resin, it will be enough for good mold surface transfer onto the blown parison in case where the temperature of the melt resin of the parison is relatively high. In that case, therefore, blow moldings having a good surface gloss can be obtained.

For the mold surface temperature, the optimum condition shall be selected, depending on the intended degree of mold surface transfer onto the blown parison, the condition of the mold surface (as to whether the surface is mirror-finished, or embossed, or patterned, or lettered), the type of the crystalline resin used, the resin temperature, the size and the wall thickness of the moldings to be produced, and the presence or absence of degassing holes through the mold.

The heating method for controlling the mold surface temperature is not specifically defined, and may be any ordinary one. For example, employable is a method of circulating a heat medium (oil) around a mold; or a method of electrically heating a mold in a mode of resistance heating or dielectric heating. A mold equipped with a heating unit may be used. Also employable is a method of selectively heating the surface of a mold with gas flames directed to the mold surface.

Before the mold is clamped, the bottom end of the parison is sealed with a pinchcock. A gas may be introduced into the sealed parison through the die or from the lower site of the parison to thereby pre-blow and expand the parison or to increase the diameter around the body of the parison, as so mentioned hereinabove.

In the blow-molding method of the invention, the parison is blown and shaped, and the blown parison is cooled under a controlled condition. For cooling the blown parison, employable is a method of cooling the mold; a method of introducing a coolant medium under pressure into the blown parison; or an internal cooling method of expelling the hot medium from the blown parison under a predetermined pressure; or a combination of any of these methods.

One embodiment of cooling a mold to thereby cool the blown parison therein is described with reference to FIG. 1. As illustrated, a coolant medium is circulated through the coolant medium jacket 4, whereby the blown parison in the mold can be efficiently cooled. In this embodiment where the mold is surrounded by the coolant medium jacket 4, a coolant medium is not in the jacket 4 while the mold surface is heated by a hot oil circulating through the mold temperature-controlling duct. Next, before the blown parison is cooled, the hot medium in the mold temperature-controlling duct is expelled through the duct, and a coolant medium is circulated in the jacket to cool the mold. This is an efficient process of cooling the blown parison. At the start of cooling the mold, the temperature of the coolant medium is preferably so controlled that it is around the dwell temperature at which the blown parison being cooled is kept for a predetermined period of time. Next, the blown parison being cooled is kept at the predetermined dwell temperature for a predetermined dwell time, and the medium having been heated at a predetermined temperature is expelled from the jacket, and thereafter a coolant medium at around room temperature is circulated through the jacket to further cool the blown parison. The cooling speed after the dwell time may fall in any range generally employed in ordinary blow-molding. For example, it may fall between 50 and 500° C./min, but preferably between 70 and 400° C./min.

In the blow-molding method of the invention, the blown parison may be cooled not only by cooling the mold but also by directly cooling the inside of the blown parison. For this, the blowing gas duct 9 used for blowing the parison hereinabove may be used. Concretely, a coolant medium is applied to the parison through the gas duct 9A, while it is discharged out through the gas duct 9B. Also in this case, the blown parison is naturally controlled at the predetermined dwell temperature for the predetermined dwell time. Accordingly, in general, the temperature of the blown parison is controlled by cooling the mold before the blown parison is kept at the predetermined dwell temperature; and while the blown parison is kept cooled at the dwell temperature, the method of cooling the mold, the method of cooling the inside of the blown parison, or a combination of the two methods may be suitably selected for ensuring the cooling rate, depending on the equipment cost, the cooling efficiency and the cooling cost.

The coolant medium for cooling the inside of the blown parison is not specifically defined. For example, it may be cold air at 23° C. (room temperature) or lower, preferably at –20° C. or lower, more preferably at –30° C. or lower. The pressure of the coolant medium to be introduced into the blown parison may fall generally between 2 and 10 kg/cm$^2$, and may be suitably varied, depending on the size and the wall thickness of the blow molding to be produced, and the type of the crystalline resin used.

To control the pressure inside the parison, in general, the pressure of the coolant medium introduced into the parison is kept constant, and the amount of the medium to be discharged out of the parison is controlled by a control valve. The coolant medium introduced into the blown parison is discharged out of it. Therefore, in the method, the blown parison is all the time cooled with a fresh low-temperature medium introduced thereinto, different from that in a circulation system.

For forcedly cooling the inside of the blown parison, a coolant medium is introduced thereinto through an inlet needle and is discharged out of it through a discharge needle, and these needles are not specifically defined. For the latitude in selecting the position at which each needle is disposed, in general, the needles are so disposed that they pass through the wall of the mold. While the parison is blown or after it has been blown, the needles are propelled into the cavity of the mold to thereby pierce the parison wall, by driving a needle-moving device. Regarding their shape, the needles may be single-tubular or double-tubular, and their tips may be cut parallel to the mold wall or obliquely thereto to be openings, or some openings may be formed through the wall of each needle before its tip.

Each needle may have one opening, but, in some cases, it is desirable that each needle has a plurality of openings. The mode of disposing the needles, the position at which the needles are disposed, and the number of the needles to be disposed shall be so determined that the coolant medium having been introduced into the blown parison through the needles can form good streams capable of efficiently cooling the wall of the blown parison, generally depending on the shape of the blow molding to be produced. Accordingly, in case where a plurality of such needles are disposed, depending on the shape and the size of the blow molding to be produced, the number of the inlet needles may differ from that of the exhaust needles.

The blow-molding method of the invention satisfies the two requirements, good appearance of the blow moldings produced and high productivity thereof that results from shortening the molding cycle. The cooling step in the blow-molding method, which is one characteristic feature of the invention, is described with reference to FIG. 2. FIG. 2 shows the relationship between the mold temperature and the cooling time. The graph of molding 5 indicates a conventional cooling pattern. In this case of molding 5, a polypropylene resin having a crystallization point of about 125° C. is blow-molded. Concretely, a parison of the resin is set in a mold heated at 120° C., then this is blown for about 20 seconds and shaped to receive the mold surface profile, and thereafter this is rapidly cooled.

As opposed to this, molding 1 and molding 3 are examples of the blow-molding method of the invention. Briefly, in molding 1, the blown parison is kept heated at about 100° C. for about 3 minutes; and in molding 3, the blown parison is kept heated at about 98° C. for 1 minute. Then, these are rapidly cooled in an ordinary manner. In these two examples, the blown parison is kept at a temperature around the (crystallization point of the crystalline thermoplastic resin –25° C.) for a predetermined dwell time. In the present invention, the dwell temperature is preferably so controlled that the crystallization rate of the resin is the greatest at around the controlled dwell temperature.

For forcedly cooling the mold, the method is not specifically defined. Preferably, however, the forcedly cooling method differs from the mold-heating method in the previous step, as it enhances the cooling efficiency. For example, in case where the mold is heated by a hot medium circulating around it, the hot medium is purged with air, after the parison has been blown and hermetically contacted with the mold surface to receive the mold surface profile, and then a low-temperature medium that differs from the hot medium is circulated around the mold for cooling the blown parison. The cooling medium that differs from the hot medium is generally meant to indicate that the two media differ from each other in temperature, and they may be of the same type or different types of oil.

For further enhancing the hermetic contact of the blown parison with the mold surface to receive the mold surface profile and for further improving the appearance of the blow molding produced in the invention, it is desirable that gas-discharging holes are formed through the mold wall. In conventional blow-molding, the size of the gas-discharging holes formed through the mold wall falls between 0.2 and 0.5 mmφ or so. In the blow-molding method of the invention, however, the size of the gas-discharging holes is at most 100 μmφ. If the size of the gas-discharging holes is larger than 100 μmφ, the blow moldings will have resin whiskers formed on their surfaces. Regarding the number of the gas-discharging holes, the hole pitch is at most 20 mm.

If the hole pitch is larger than 20 mm, the surfaces of the blow moldings will be fogged owing to gas discharge failure. The depth of the gas-discharging holes may fall generally between 0.2 and 0.5 mm, and the holes may be formed, for example, in an electroforming method. The surface condition of the mold is not specifically defined. The surface of the mold may be processed in any desired manner according to the object of the mold. For example, it may be mirror-finished to have a surface roughness of at moat 0.5 S, or may be embossed, or may be patterned, or may be lettered, or may be figured. Two or more such processing methods may be combined for processing the surface of the mold.

In the blow-molding method of the invention essentially for crystalline thermoplastic resin, blow moldings of any type that may be produced in ordinary blow-molding may be produced. Concretely, the resin layer of the blow moldings produced in the blow-molding method of the invention may have a single-layered structure or a multi-layered structure; and the hollow inside the blow moldings may have any desired structure. If desired, one blow molding may have a plurality of hollows.

The crystalline thermoplastic resin to be blow-molded in the invention is not specifically defined, including, for example, polyolefin resins, polyamide resins, polyester resins, and syndiotactic polystyrenes. The polyolefin resins include, for example, homopolymers and copolymers of α-olefins such as ethylene, propylene, butene-1, 3-methylbutene-1, 3-methylpentene-1, and 4-methylpentene-1; copolymers of such monomers with any other unsaturated comonomers capable of copolymerizing with the monomers. Specific examples of the resins are polyethylene resins such as high-density, middle-density or low-density polyethylenes, linear low-density polyethylenes, ethylene-vinyl acetate copolymers and ethylene-ethyl acrylate copolymers; polypropylene resins such as syndiotactic polypropylenes, isotactic polypropylenes, propylene-ethylene random copolymers and block copolymers; and poly-4-methylpentene-1.

The polyamide resins include, for example, ring-cleaved polymers of cycloaliphatic lactams, such as 6-nylon and 12-nylon; polycondensates of aliphatic diamines and aliphatic dicarboxylic acids, such as 6,6-nylon, 6,10-nylon and 6,12-nylon; polycondensates of aromatic diamines and aliphatic dicarboxylic acids such as those of m-xylenediamine and adipic acid; polycondensates of aromatic diamines and aromatic dicarboxylic acids such as those of p-phenylenediamine and terephthalic acid, and those of m-phenylenediamine and isophthalic acid; and polycondensates of amino acids such as 11-nylon.

The polyester resins may be polycondensates of aromatic dicarboxylic acids and alkylene glycols. Their specific examples are polyethylene terephthalate, polybutylene terephthalate, and polyethylene naphthalate. Polyacetal resins are also usable in the invention, including, for example, homopolymers such as polyoxymethylene, and formaldehyde-ethylene oxide copolymers obtained from trioxan and ethylene oxide.

In the invention, one or more of the above-mentioned crystalline thermoplastic resins may be used either singly or as combined. If desired, they may be further combined with any other resins such as low-crystalline resins, amorphous resins, and elastomers mentioned hereinunder, and also with inorganic fillers and various additives. Of the thermoplastic resins mentioned above, preferred for use in the invention are polypropylene resins such as polypropylene homopolymers, block copolymers or random copolymers of propylene and other olefins, and their mixtures; and high-density polyethylene resins. The polypropylene resins and high-density polyethylene resins may contain acid-modified polyolefin resins such as those modified with unsaturated carboxylic acid or their derivatives.

The polypropylene resins for use herein preferably have a melt index, MI (measured according to JIS K7210, at 230° C. under a load of 2.16 kg) falling between 0.1 and 2.0 g/10 min, more preferably between 0.2 and 1.0 g/10 min, as their drawdown resistance and blow moldability are good. If desired, a high-density polyethylene having MI (measured according to JIS K7210, at 190° C. under a load of 2.16 kg) of from 0.001 to 1 g/10 min, preferably from 0.01 to 0.5 g/10 min may be added to the polypropylene resin to improve the moldability of the resin mixture. In the blow moldings, the amount of the high-density polyethylene resin may fall between 0 and 30% by weight. Also if desired, an elastomer such as ethylene-propylene copolymer elastomer or ethylene-propylene-diene copolymer elastomer having a Mooney viscosity ($ML_{1+4}$, 100° C.) of from 10 to 120 may also be added to the resin to be blow-molded. In the blow moldings, the amount of the elastomer may fall between 0 and 30% by weight.

The crystallization point of the crystalline thermoplastic resin referred to herein indicates that of the crystalline thermoplastic resin alone. However, in case where a nucleating agent is added to the resin to improve the resin crystallinity, or in case where any other thermoplastic resin is added thereto or a filler such as talc is thereto, the crystallization point of the resin indicates that of the resin mixture to be actually blow-molded.

The crystallization point of the crystalline thermoplastic resin may be measured according to JIS K7121. In the invention, Perkin-Elmer's DSC-7 is used for the measurement. Concretely, a crystalline polypropylene resin is heated at a heating rate of 10° C./min, then kept at 230° C. for 3 minutes, and then cooled at a cooling rate of 10° C./min. The peak temperature in the heat cycle is the crystallization point of the resin.

In the blow-molding method of the invention, an inorganic filler may be added to the molding resin to improve the toughness, the strength and the heat resistance of the blow moldings produced, and to improve the cooling behavior of the resin parison. In the blow moldings, the amount of the inorganic filler may fall between 0 and 50% by weight, but preferably between 5 and 30% by weight. The inorganic filler includes, for example, talc, mica, calcium carbonate, glass fibers, milled fibers, carbon fibers, magnesium sulfate fibers, potassium titanate fibers, titanium oxide fibers, and magnesium oxysulfate fibers. An organic filler and organic fibers may also be added to the molding resin. Above all, preferred are talc, mica and glass fibers.

Also if desired, any of antioxidants, antistatic agents, UV absorbents, light stabilizers, flame retardants, flame retardation promoters, pigments, dispersants and nucleating agents may be added to the molding resin. In the blow-molding method of the invention, it is desirable that the molding resin composition contains from 5 to 30% by weight, preferably from 10 to 25% by weight of talc, as the cooling efficiency of the melt parison of the resin composition is improved and the blow moldings produced have a good appearance. Any other resins may be added to the molding resin, as so mentioned hereinabove. The blow moldings produced in the invention may be single-layered ones or multi-layered ones. Regarding the constitution of the layers to form the multi-layered blow moldings, different types of crystalline thermoplastic resins may be multi-layered; or crystalline thermoplastic resin(s) and amorphous resin(s) may be multi-layered; or resins differing in point of the presence or absence of colorant(s), additive(s) and filler(s) therein may be multi-layered.

The blow moldings produced in the blow-molding method of the invention have good properties intrinsic to crystalline resin, and, not warped, have a good surface gloss and a good appearance with no sinkmarks. According to the invention, therefore, crystalline polypropylene resins can be used even in the field in which only amorphous resins are used because of the reason that blow moldings of crystalline resins are not good.

The invention is described with reference to the molding experiment mentioned below, which, however, is not intended to restrict the scope of the invention.

Molding Experiment

Blow moldings were produced under the condition mentioned below.

1. Molding Material:
(1) H-PP: Polypropylene homopolymer (Idemitsu Petrochemical's IDEMITSU PP, E-105GM, having MI of 0.6 g/10 min (at 230° C. under a load of 2.16 kg), and a crystallization point of 126.8° C.).
(2) B-PP: Propylene block copolymer (Idemitsu Petrochemical s IDEMITSU PP, E-185G, having MI of 0.4 g/10 min (at 230° C. under a load of 2.16 kg), and a crystallization point of 126.3° C.).

2. Blow Moldings Produced:
cases, having a size of 400×200×50 mm, a wall thickness of 3 mm, and a weight of about 0.8 kg.

3. Molding Machine:
90 mmφ blow-molding machine, equipped with a 100 mmφ die and a 25-liter accumulator. The clamping pressure is 60 tons; and the screw revolution is 40 rpm.

4. Mold:
(1) Mold surface: mirror-finished to have a surface roughness of 0.2 S, having 50 μmφ gas-discharging holes at a hole pitch of 5 mm.
(2) Mold heating: Hot oil (140° C.) is circulated through the mold temperature-controlling duct.
(3) Dwell temperature retention in the step of cooling the mold: Hot water at 80 to 105° C. is circulated in the jacket around the mold.
(4) Mold cooling: The hot water is removed, and cold water at 20° C. is circulated in the jacket.

5. Blow-molding Method:
The molding resin shown in Table 1 is blow-molded under different cooling conditions to produce blow moldings. Air is introduced into the resin parison from the opposite two ends of the diagonal line drawn to run through the resin parison.

(1) Molding temperature:
Cylinder temperature: 230 to 190° C.
Cross-head temperature: 190° C.
Die temperature: 190° C.
Resin temperature: 220° C.

(2) A melt parison is extruded into the cavity of the mold heated at 120° C.; the bottom end of the parison is sealed; the mold is clamped; and the parison is blown with air (5 to 6 kg/cm$^2$) introduced thereinto, and is thus pressed against the mold surface to receive the mold surface profile. 20 seconds after the parison has been blown, the mold is cooled. In ordinary condition, the mold is cooled at a cooling rate of about 200° C./min. When the mold is kept at a predetermined dwell temperature for a predetermined dwell time, it is cooled at a cooling rate of about 100° C./min.

6. Result:
The surface gloss of each blow molding is measured; and the appearance thereof is macroscopically checked. The result is in Table 1.

OO: Excellent.
O: Good.
δ: The blow molding was slightly warped, and had a few sinkmarks.
x: The blow molding was significantly warped, and had many sinkmarks.

From the result in Table 1, it is understood that, when the resin parison is cooled under ordinary condition, it is difficult to solve the problem of sinkmarks in blow moldings.

TABLE 1

| | | | Cooling Condition | | Molding | Evaluation of Moldings | |
|---|---|---|---|---|---|---|---|
| | | | Dwell | | | | |
| | | Type of Resin Used | Temperature (° C.) | Dwell Time (min) | Cycle (min) | Surface Gloss | Sinkmarks |
| Molding 1 | method of the invention | H-PP | 105 | 3 | 4 | 94 | oo |
| Molding 2 | method of the invention | B-PP | 105 | 3 | 4 | 93 | oo |
| Molding 3 | method of the invention | H-PP | 105 | 1 | 3 | 94 | o |
| Molding 4 | method of the invention | B-PP | 105 | 1 | 3 | 94 | Δ |
| Molding 5 | | H-PP | — | — | 3 | 94 | x |
| Molding 6 | | B-PP | — | — | 3 | 94 | x |
| Molding 7 | method of the invention | H-PP | 105 | 60 | 62 | 94 | oo |

INDUSTRIAL APPLICABILITY

The blow moldings produced according to the blow-molding method of the invention have good mold transferability, and though having a hollow, they have a high degree of surface gloss of 90% or more. In addition, though they have a hollow and a high surface gloss, they are not warped and have no sinkmarks, and their appearance is good. Their productivity is high. Even when not subjected to secondary processing, such as polishing or coating, they serve directly as final products.

What is claimed is:

1. A method for producing blow moldings of crystalline thermoplastic resin, which comprises setting a melt parison of a crystalline thermoplastic resin in a mold and then blowing the parison, the method comprising the steps of (1) blowing and shaping the parison at a mold temperature falling between the crystallization point of the resin minus 10° C. and the melting point of the resin;
(2) cooling the blown parison at a temperature falling between the crystallization point of the resin minus 15° C. and the crystallization point thereof minus 45° C.,
(3) keeping the blown parison for a dwell time falling between 30 and 300 seconds; and
(4) cooling the blown parison in an ordinary manner.

2. The blow-molding method as claimed in claim 1, wherein the mold temperature falls between (the crystallization point of the resin −10° C.) and (the crystallization point thereof +10° C.), and the dwell time falls between 40 and 250 seconds.

3. The blow-molding method as claimed in claim 1, wherein the mold cooling rate falls between 50 and 500° C./min.

* * * * *